Patented June 24, 1930

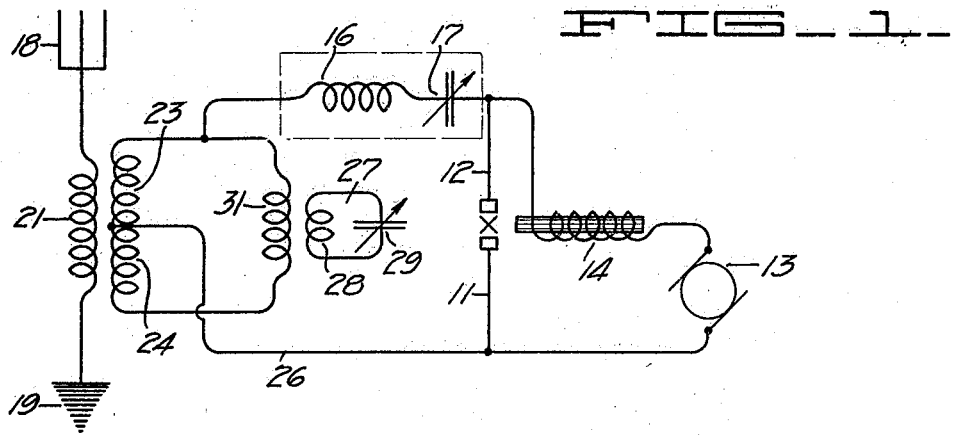
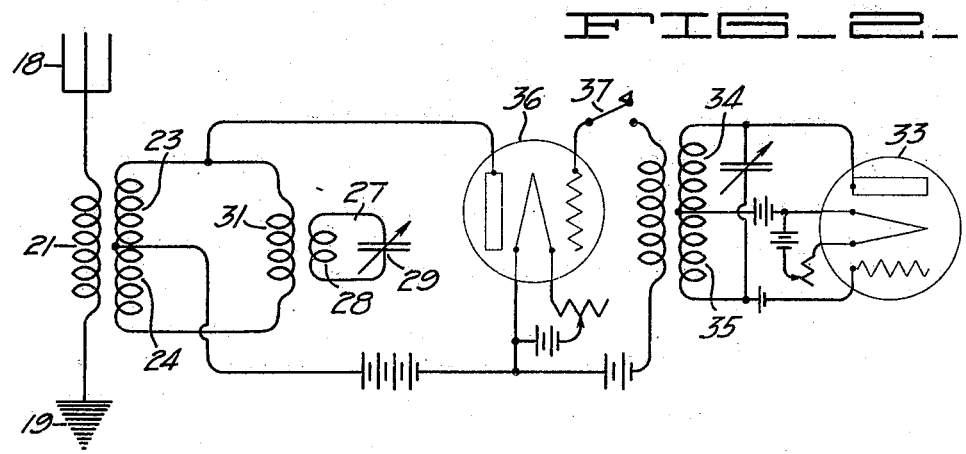
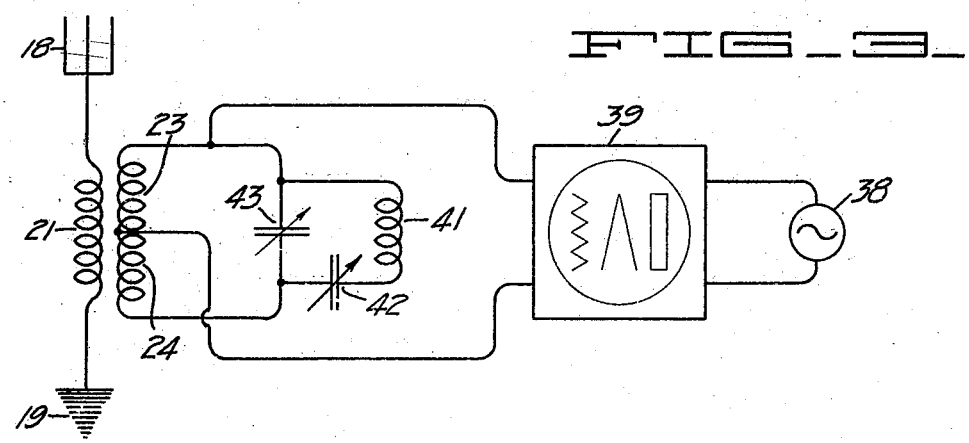

1,766,040

UNITED STATES PATENT OFFICE

FREDERICK A. KOLSTER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

SIGNAL-TRANSMITTING SYSTEM

Application filed July 30, 1927, Serial No. 209,405. Renewed August 19, 1929.

This invention relates generally to systems for effecting transmission of signals by radio or high frequency electrical energy.

It is an object of this invention to devise means in a signaling system for preventing the transmission of undesired harmonic frequencies.

It is a further object of this invention to devise means for and a method of efficiently transferring waves of a desired radio frequency to a transmitting circuit while neutralizing waves of undesired frequencies.

Referring to the drawing:

Figure 1 is a circuit diagram illustrating the invention incorporated with an arc converter type of oscillation generator.

Fig. 2 is a circuit diagram illustrating the invention incorporated with an electron emission type of oscillator.

Fig. 3 is a circuit diagram illustrating a modification shown in Figs. 1 and 2.

The invention may be outlined briefly as comprising a pair of reactive elements for selectively transferring radio energy of the desired frequency from an oscillation generator to a transmission circuit. The radio energy is admitted to these elements in such a way that for the energy of undesired frequencies, their effect upon the transmission circuit is neutralized, while for the desired frequency neutralization is prevented so that a transfer of energy to the transmission circuit is effected.

In that embodiment of the invention shown in Fig. 1, I have shown a high frequency generating means in the form of an arc converter. Such a converter may comprise arc electrodes 11 and 12 energized from a suitable source of current such as a direct current generator 13. Included in the positive current supply line there is a high frequency choke 14, which may likewise serve to provide a magnetic field for the arc. The oscillation circuit for the converter may comprise an inductance 16 in series with a capacitance 17. Where the system is utilized for the transmission of radio signals, the transmission circuit may comprise an antenna 18 connected to ground 19 thru a suitable inductance 21.

As a means for effecting a transfer of energy from the oscillation circuit of the converter to the transmission circuit, I have shown a pair of reactive elements, preferably in the form of inductance coils 23 and 24. These coils are connected with the converter oscillation circuit so as to form two branch or parallel paths for high frequency currents. For example they may be wound as a single continuous coil as shown, having a center tap which is connected to one side, the negative or grounded side, of the converter by conductor 26. The outer terminals of coils 23 and 24 are connected together through inductance 31, one side of which is connected to one terminal of the series circuit formed by inductance and capacitance 16 and 17. The circuit including inductance 31 is associated with a resonant circuit 27 which is capable of being sharply tuned to the frequency which it is desired to transmit. This resonant circuit is shown as consisting of an inductance 28 shunted by capacitance 29, and is coupled to the path including coil 24 by means of inductance 31.

When an arc converter is in operation a considerable amount of the high frequency current generated consists of harmonics which cause considerable interference if they are permitted to be radiated from the antenna. Assuming that it is desired to transmit only the fundamental frequency generated, the resonant circuit 27 is tuned to this frequency. Coil 23 is energized by energy of all frequencies generated since its current path has a comparatively low impedance for all such frequencies. The current path of coil 24 likewise has comparatively low impedance for all undesired frequencies, but for the selected frequency to which circuit 27 is resonant it has a comparatively high impedance due to the impedance introduced by the resonant circuit 27. The result is that for undesired harmonic frequencies coils 23 and 24 are both energized to set up opposing magnetic fields, so that their joint effect upon the transmission circuit is nil. However for the frequency to which circuit 27 is resonant, the energy in coil 23 is unneutralized due to the high impedance of the paths of coil 24, and therefore coil 23 will effect a transfer of energy to the transmission circuit. The effect of resonant circuit 27 not only permits the field of coil 23 to be unneutralized, but for the selected frequency it also causes a current flow to occur between coils 23 and 24 in series, due to circulatory current set up in the resonant circuit which is fed back thru coils 23 and 24. Therefore for the desired frequency coil 24 acts additively rather than in opposition to coil 23.

Instead of utilizing the system described above for selecting the fundamental frequency of an arc converter, it is obvious that the invention may be applied for selecting a harmonic frequency to the exclusion of other harmonic frequencies and the fundamental frequency. In this case the harmonic frequency selected from the converter would probably be amplified before transferring the same to the transmission circuit.

In Fig. 2 I have illustrated the invention incorporated with an electron emission tube oscillator. For example I have shown the usual type of three element oscillator tube 33 having its plate and grid circuits coupled together as by means of inductances 34 and 35. This oscillator may be utilized for transferring energy direct to the transmission circuit, or preferably it is employed as a master oscillator for exciting the input of a power amplifying tube 36. The output of amplifier tube 36 is connected directly to coils 23 and 24 in a manner similar to that described with respect to Fig. 1, and suitable modulating or coding means may be employed, as represented by the key 37. The operation of this system is substantially the same as that shown in Fig. 1, in that the energy of undesired harmonics repeated in the output of amplifier tube 36 is neutralized.

In Fig. 3 I have illustrated a modification of the resonant circuit shown in Figs. 1 and 2. In this figure I have illustrated diagrammatically the high frequency generating means as comprising the oscillator 38 supplying the input of amplifier 39. The resonant circuit consists of inductance 41 in series with capacitances 42 and 43, and this circuit is capacitatively coupled to the current path of coil 24 by means of condenser 43. The degree of coupling between the resonant circuit and the current path of coil 24 may be varied by adjusting the value of condenser 43. The operation of this arrangement is the same as the system previously described, in that when the resonant circuit is tuned to the frequency which it is desired to transmit, the energy imparted to coil 23 is unneutralized, and current will flow between coils 23 and 24 in series to effect efficient transfer of energy of this frequency.

I claim:

1. In a radio transmitting system, means for generating radio frequency energy, said means producing frequencies other than those desired, a transmission circuit, means for coupling the generating means with the transmission circuit for transfer of energy, said means including a pair of reactive elements electrically associated with the generating means so as to form branch paths for flow of current, said paths being of relatively low impedance for undesired frequencies, said elements being so associated with the transmission circuit that waves of undesired frequencies oppose each other and do not affect the transmission circuit, and a resonant circuit cooperatively associated in one of said branch paths whereby for a narrow band of desired frequencies said one branch path presents a relatively high impedance.

2. In a radio transmission system, means for generating radio frequency, said means producing frequencies other than those desired, a transmission circuit, means for coupling the generating means with the transmission circuit for transfer of a narrow band of desired frequencies, said means including a pair of coils electrically associated with the generating means so as to form two parallel paths for flow of current, said paths being of relatively low impedance for currents of frequencies falling outside said band, said elements being conjointly coupled to the transmission circuit so that the effects on the transmission circuit currents of frequencies outside said band thru both said branches are substantially neutralized, and a sharply tuned resonant circuit associated with one of said paths whereby for said band of frequencies, said one path presents a relatively high impedance, the excitation of said resonant circuit from the generating means causing a current to flow between said coils for the desired frequency band whereby for said band the coils act additively to transfer energy to the transmission circuit.

3. The method of suppressing harmonics in radio transmission systems characterized by the use of a pair of coils for conjointly coupling a radio generator to a transmitting circuit, said method comprising admitting the energy of undesired harmonics to both coils whereby the effect of such energy is neutralized with respect to the transmission circuit, and imposing a high impedance for energy flow thru one coil for energy of the desired frequency band whereby said other coil serves to transfer energy of the desired band to the transmission circuit.

In testimony whereof, I have hereunto set my hand.

FREDERICK A. KOLSTER.